United States Patent [19]

Ekstrom et al.

[11] Patent Number: 4,692,908
[45] Date of Patent: Sep. 8, 1987

[54] METHOD AND APPARATUS FOR INVESTIGATING STAND-OFF IN A BOREHOLE

[75] Inventors: Michael P. Ekstrom, Redding; R. Mark Havira, New Fairfield, both of Conn.

[73] Assignee: Schlumberger-Doll Research, Ridgefield, Conn.

[21] Appl. No.: 361,224

[22] Filed: Mar. 24, 1982

[51] Int. Cl.$^4$ .......... G01V 1/00; G01V 3/02; G01U 3/04; H04B 17/00
[52] U.S. Cl. .......... 367/27; 367/25; 367/13; 324/355; 324/367
[58] Field of Search .......... 73/151, 157; 181/102, 181/105, 104; 175/45; 367/25, 27, 35, 86, 911, 912, 13, 902, 138; 324/338, 346, 355, 366, 367

[56] References Cited

U.S. PATENT DOCUMENTS

| | | | |
|---|---|---|---|
| 2,648,056 | 8/1953 | Jakosky | 367/27 |
| 2,888,824 | 6/1959 | Henry | 73/615 |
| 3,130,808 | 4/1964 | Walker, Jr. et al. | 367/27 |
| 3,175,639 | 3/1965 | Liben | 367/35 |
| 3,330,374 | 7/1967 | Broussard et al. | 367/27 |
| 3,436,720 | 4/1969 | Patterson | 367/104 |
| 3,564,914 | 2/1971 | Desai et al. | 181/102 |
| 3,739,328 | 6/1973 | Beil | 367/25 |
| 3,883,841 | 5/1975 | Norel et al. | 367/25 |
| 3,978,939 | 9/1976 | Trouiller | 181/106 |
| 4,170,765 | 10/1979 | Austin et al. | 367/908 |
| 4,210,969 | 7/1980 | Massa | 367/902 |
| 4,255,798 | 3/1981 | Havira | 367/35 |
| 4,271,490 | 6/1981 | Minohara et al. | 367/122 |
| 4,271,707 | 6/1981 | Lakin | 73/614 |
| 4,281,550 | 8/1981 | Erikson | 73/626 |
| 4,346,460 | 8/1982 | Schuster | 367/28 |
| 4,391,124 | 7/1983 | Drost et al. | 367/13 |
| 4,468,623 | 8/1984 | Gianzero et al. | 324/355 |

FOREIGN PATENT DOCUMENTS 765916  8/1967  Canada .......... 250/299

OTHER PUBLICATIONS

Article—Removal of Intervening System Distortion by Deconvolution, R. L. Rhoads and M. P. Ekstrom, IEEE Transactions on Instrumentation and Measurement, vol. IM-17, No. 4, Dec. 1968, pp. 333-337.
Article—On the Application of Eigenvector Expansions to Numerical Deconvolution—Journal of Computational Physics, vol. 14, No. 4, Apr. 1974, pp. 319-340, M. P. Ekstrom and R. L. Rhoads.
Article—The High Resolution Dipmeter Tool, L. A. Allaud and J. Ringot, "The Log Analyst", May-Jun., 1969.

Primary Examiner—Thomas H. Tarcza
Assistant Examiner—Daniel T. Pihulic
Attorney, Agent, or Firm—Kenneth Olsen; Louis H. Reens

[57] ABSTRACT

An acoustic method and apparatus for investigating an earth formation penetrated by a borehole are described. Acoustic transducers are mounted on a tool to accurately determine the distance between a segment of the tool and the wall of the borehole. The acoustic transducers are positioned in such manner that the stand-off distance between individual resistivity measuring electrodes in an array, which is also mounted on the tool segment, and the borehole wall can be measured. The stand-off measurement is recorded and may be used to correct the electrode resistivity measurements. In one embodiment a calibration of acoustic transducers as a function of depth is obtained by employing acoustic calibrating transducers to compensate for borehole environment effects on the performance of the acoustic transducers as well as determine the acoustic velocity of the borehole fluid, such as mud. Several embodiments are described.

28 Claims, 17 Drawing Figures

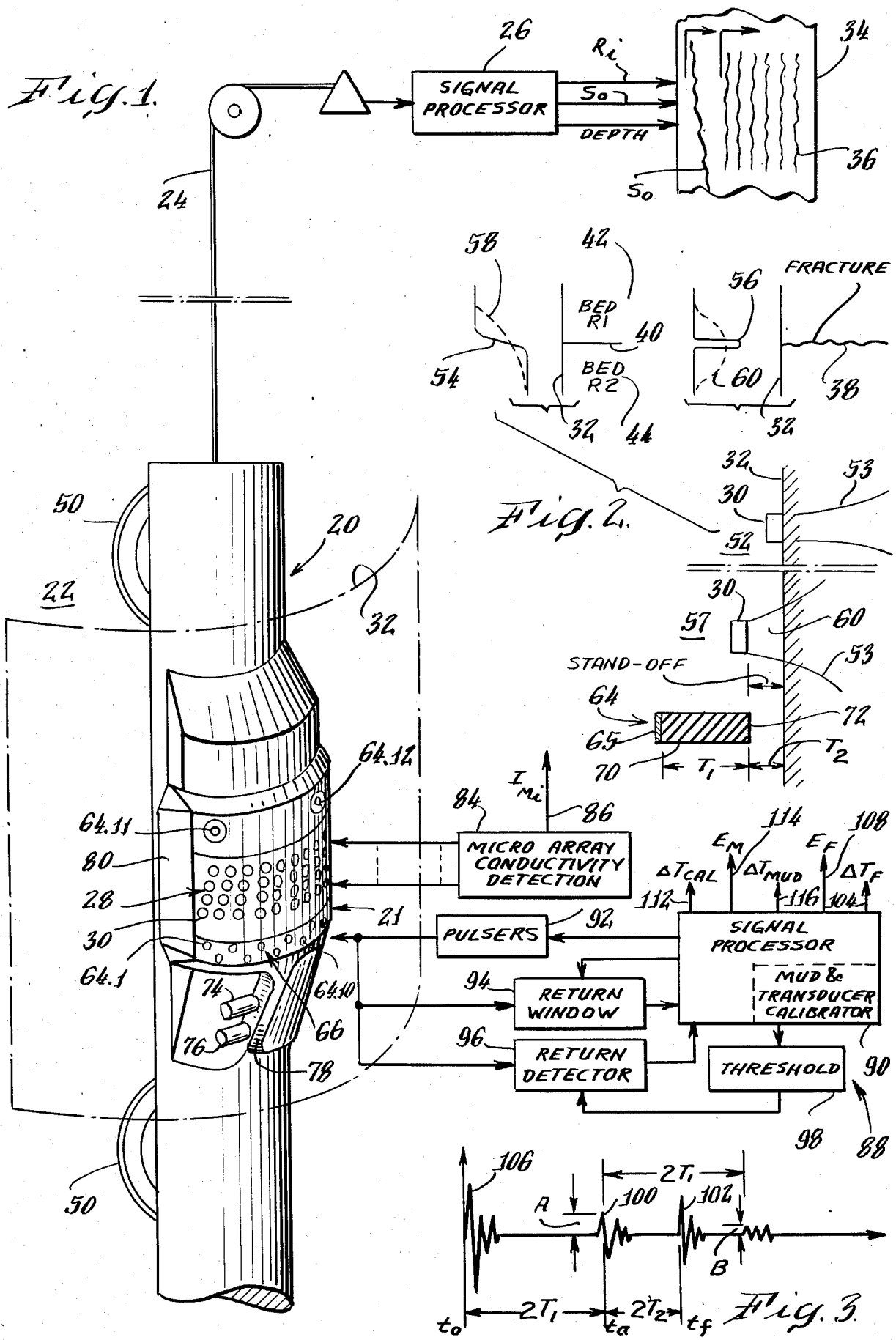

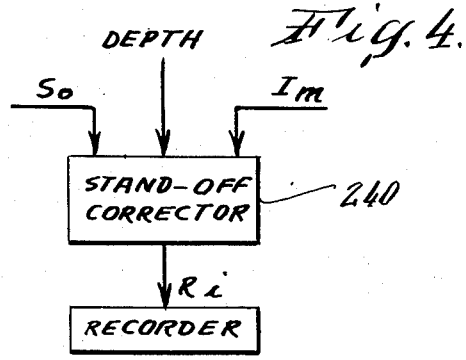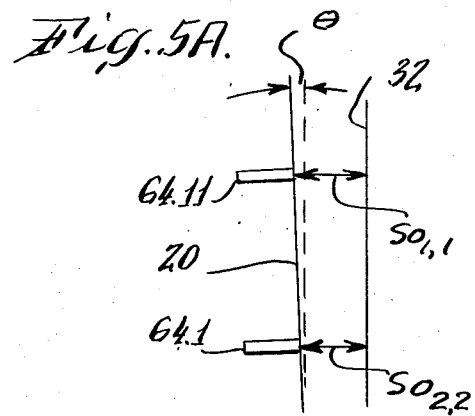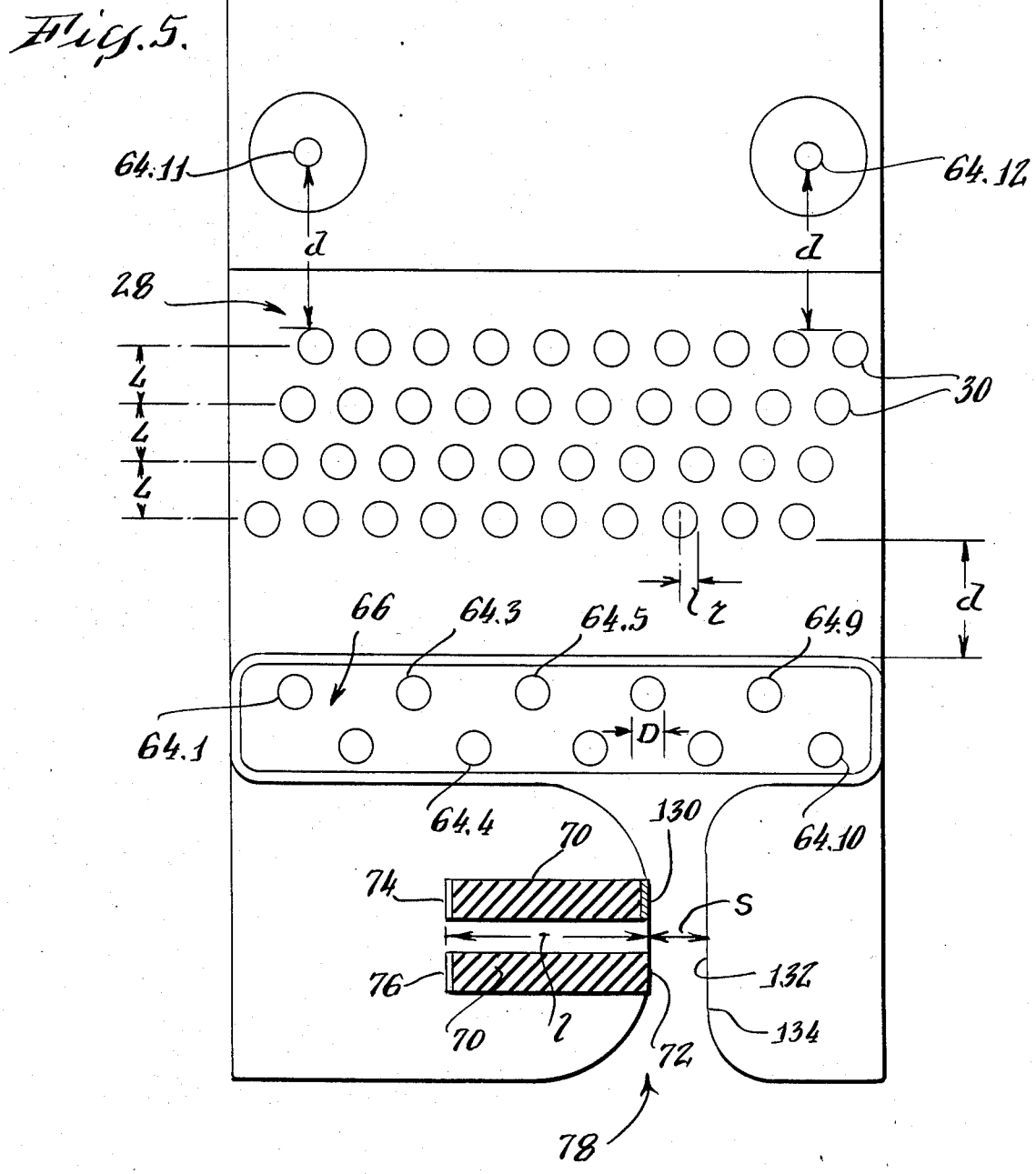

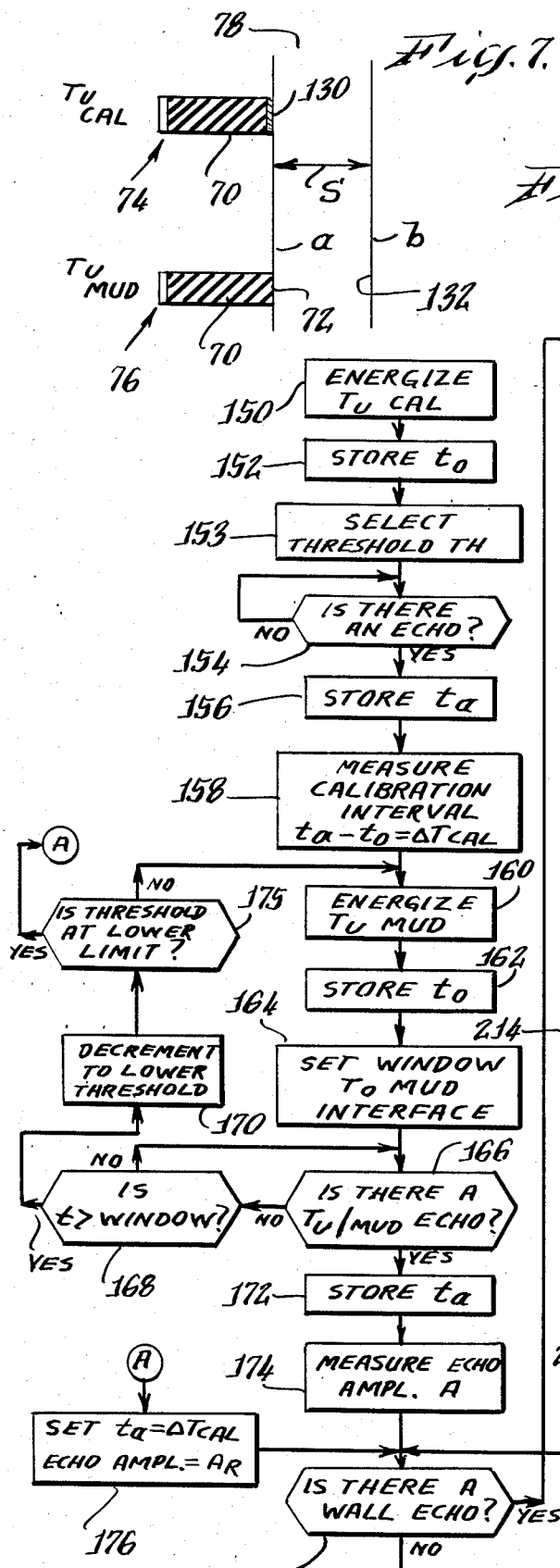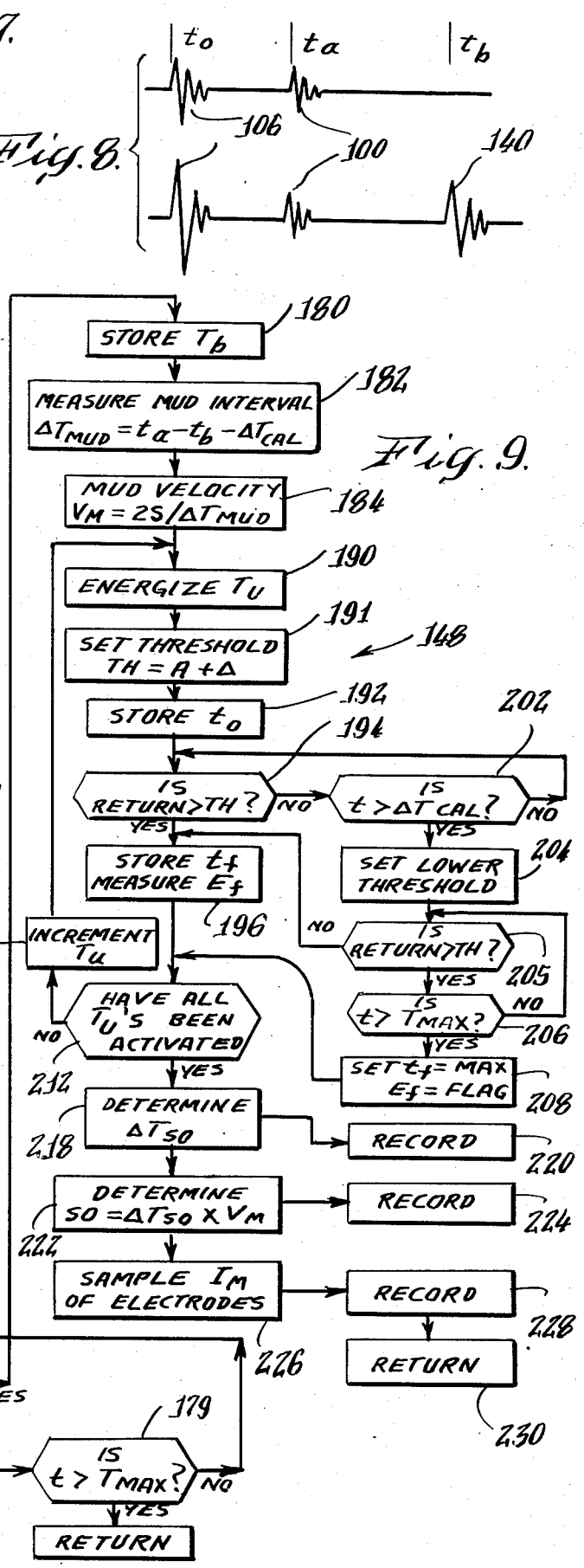

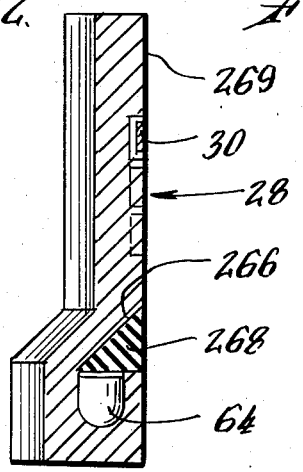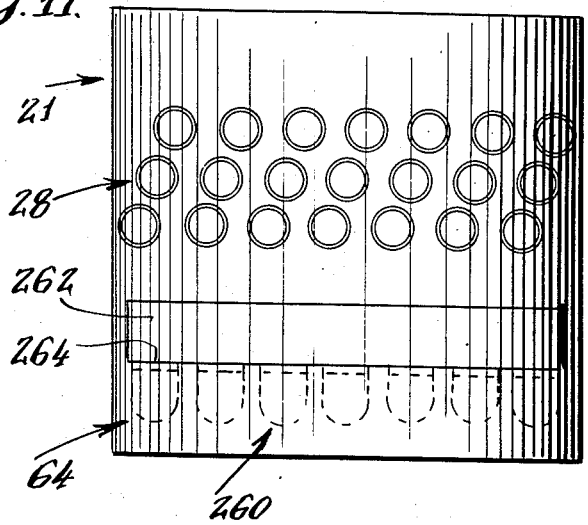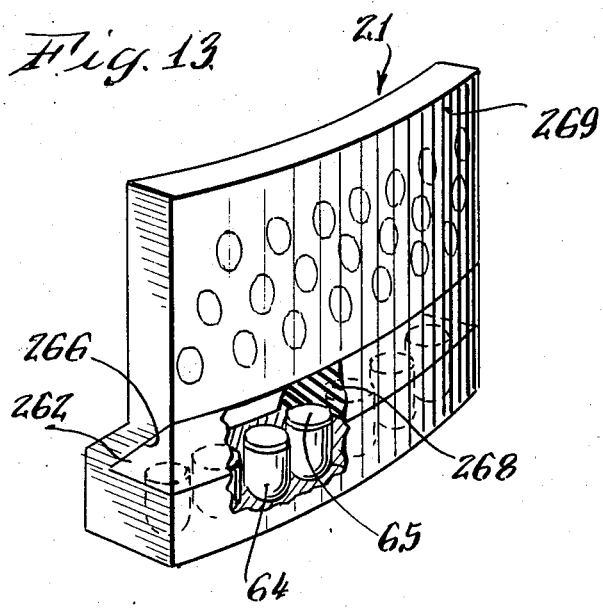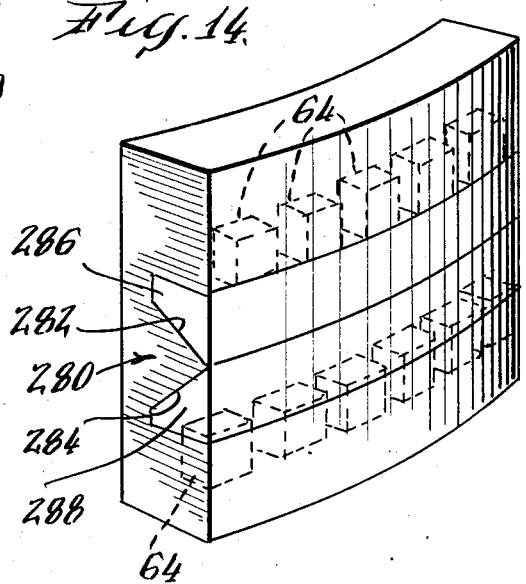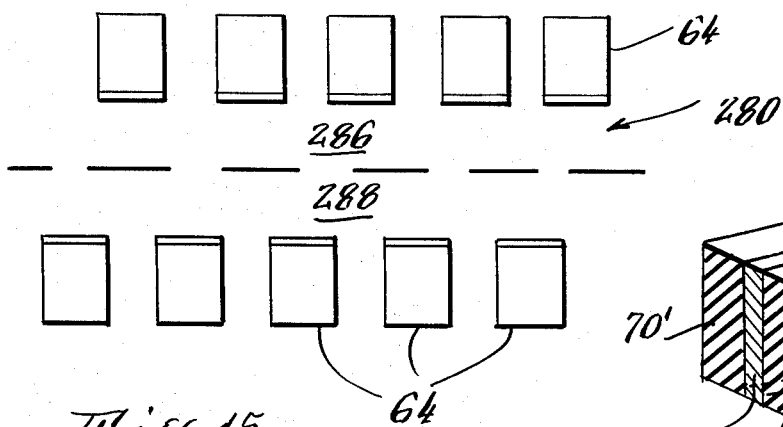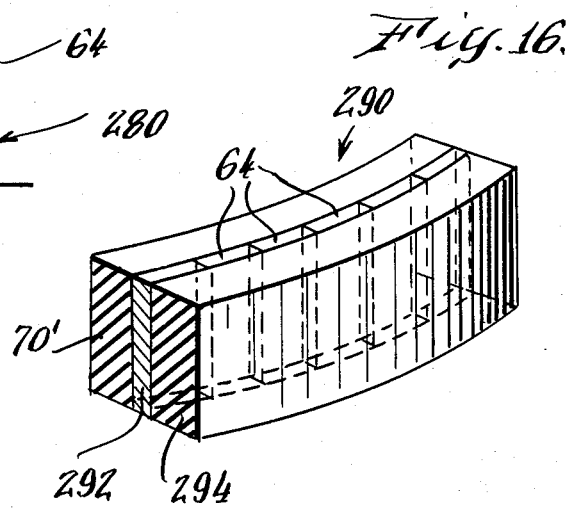

METHOD AND APPARATUS FOR INVESTIGATING STAND-OFF IN A BOREHOLE

FIELD OF THE INVENTION

This invention relates to acoustic investigations of an earth formation penetrated by a borehole generally and more specifically to an acoustic method and apparatus for enhancing earth formation investigations which are affected by the occurrence of a stand-off distance between the segment of the tool from where the investgation is made and the wall of the borehole.

BACKGROUND OF THE INVENTION

Acoustic pulse echo investigations of earth formations have been described in the art. For example, U.S. Pat. No. 4,255,798 to R. M. Havira describes a method and apparatus for investigating a casing to cement bond by directing acoustic pulses from inside the borehole at radial segments of the casing and analyzing acoustic returns. The U.S. Pat. No. 3,833,841 to Norel et al describes a pad mounted pulse-echo acoustic transducer for analyzing the casing cement interface. Special intermediate layers are employed to match acoustic impedances.

In the investigation of an earth formation, tools employing various sources of energy may be employed. In some tools the spacing between the segment of the tool on which the investigating energy source is located and the borehole wall affects the investigation and techniques are employed to bring this segment of the tool in close proximity with the wall of the borehole. This may involve use of one or several pads pressed against the borehole wall or by pressing the segment of the tool to one side of the borehole wall with tool mounted bow springs to assure that the stand-off sensitive energy source or transducer is in close proximity to the borehole wall. Notwithstanding use of such techniques, the tool segment may be forced to stand away from the borehole wall by the presence of a mudcake. This stand-off may, therefore, undesirably affect the accuracy or interpretation of the tool's investigation of the earth formation. In some instances, cavities in the borehole wall may appear in front of the tool segment and it is desirable to be able to recognize or at least distinguish such cavities from other formation characteristics as a stand-off type measurement.

Techniques have been proposed to measure mudcake thickness. For example, according to one technique, a caliper is employed to measure the borehole diameter and reductions from the original drilling diameter are interpreted as an indication of the thickness of the mudcake. The caliper's use for a mudcake thickness measurement, however, requires extensive depth shifting to relate the measured mudcake thickness to that actually opposite the tool segment carrying the investigating transducer and as a result may not be sufficiently precise when a high spatial resolution investigation of the borehole wall is being made. This problem is particularly acute when the tool's logging motion is irregular, making precise high resolution depth shifting extremely difficult.

An acoustic pulse echo technique to measure mud cake thickness is described in the U.S. Pat. No. 3,175,639 to Liben. In the latter patent an indication of the acoustic impedance of a flushed zone behind the mudcake is derived from a measurement of the change between an acoustic reflection and the applied acoustic pulse. The acoustic pulse generator described in Liben, however, is sensitive to temperature and pressure changes encountered at borehole depths and since these render mudcake thickness measurements less precise, the temperature as a function of depth is computed or a temperature log is made and the pressure as a function of depth is computed. In one technique described in Liben, an acoustic transducer is spaced at some distance from the surface of the borehole wall requiring that the borehole mud be traversed by the applied acoustic pulse and reflections caused thereby along this distance. This tends to introduce inaccuracies in the mudcake thickness measurement and impair resolution, due to factors such as attenuation and beam spreading. The acoustic transducer could be placed in close proximity to the borehole wall as taught by Liben, but in such case the measurement of relatively thin mudcake layers becomes difficult.

When a formation investigation is affected by the presence of standoff, it is desirable to measure the stand-off over a range of thickness and in a manner sufficient to resolve ambiguities introduced by the presence of stand-off. The known prior art techniques for measuring mudcake thickness are, however, not sufficient to aid in resolving ambiguities or correcting measurements made in a high resolution formation investigation which is sensitive to a standoff condition from the borehole wall.

SUMMARY OF THE INVENTION

In a method and apparatus in accordance with the invention for investigating an earth formation penetrated by a borehole wherein a source of energy is used to measure a parameter which is sensitive to a stand-off of the source from the borehole wall, an acoustic measurement of the stand-off is made to resolve an ambiguity in the parameter measurement due to such stand-off. As described herein, the invention is particularly effective in the investigation of the formation with an array of small button electrodes capable of making a high resolution resistivity investigation of a contiguous segment of the borehole wall. At least one acoustic transducer is located in close proximity to the array to determine the presence of stand-off of the array from the borehole wall and thus enable one to resolve ambiguities in the resistivity investigation introduced by the stand-off.

With reference to one embodiment of the invention, a plurality of acoustic transducers are used to determine the presence of stand-off by employing an accurate pulse echo technique. The acoustic transducers may be distributed in an array extending laterally across a segment of the tool so that the stand-off can be measured over an extended area. This may advantageously include corrections for borehole environmental effects such as pressure and temperature changes and the acoustic property of the borehole fluid. The correction of stand-off is obtained with measurements made with calibrating acoustic transducers which enable automatic compensation for borehole environmental effects and provide local measurements of the acoustic wave velocity in the borehole fluid.

With one acoustic technique for determining stand-off in accordance with the invention, stand-off measurements are made with an accuracy sufficient to enable one to resolve ambiguities introduced in the stand-off sensitive parameter measurement. In addition, stand-off is measured with a spatial resolution that approaches the spatial resolution of the parameter measurements. For example, in one embodiment in which an array of electrodes provides a high resolution resistivity investigation of the borehole wall, a plurality of acoustic transducers are strategically located with respect to and in close proximity to the array to enable a measurement of the stand-off in front of each electrode in the array. The ambiguities introduced by the stand-off may then be resolved by either recording the stand-off measurements alongside the resistivity measurements with appropriate depth-shifting or by correcting the resistivity measurements with a deconvolution technique.

It is, therefore, an object of the invention to provide a method and apparatus to determine the presence of stand-off from a borehole wall and resolve ambiguities in stand-off sensitive parameter measurements made with a tool in the borehole. It is a further object of the invention to measure such stand-off with a spatial resolution sufficient to complement high spatial resolution electrical measurements of the earth formation and with a precision commensurate with the sensitivity of the electrical measurement to a stand-off condition. It is still further an object of the invention to provide an apparatus and method to measure stand-off and correct a stand-off sensitive parameter measurement with such stand-off measurement.

These and other objects and advantages of the invention can be understood from the following description of several embodiments in accordance with the invention described in conjunction with the drawings.

BRIEF DESCRIPTION OF DRAWINGS

FIG. 1 is a perspective and schematic representation of one apparatus in accordance with the invention;

FIG. 2 is a schematic view of several operating conditions and response curves to illustrate the problem at which the invention is directed at an acoustic transducer used in accordance with the invention;

FIG. 3 is a typical timing diagram of a waveform generated by and detected with an acoustic transducer employed in a method and apparatus in accordance with the invention;

FIG. 4 is a block diagram of an apparatus used to correct a measured parameter for stand-off in accordance with the invention;

FIG. 5 is a planar front elevation view of the apparatus of FIG. 1;

FIG. 5A is a schematic representation of a tilted tool condition;

FIG. 7 is a schematic section view of calibrating acoustic transducers employed in accordance with the invention;

FIG. 8 is a timing diagram representative of waveforms generated and detected by the transducers of FIG. 7;

FIG. 9 is a flow chart for a signal processor routine to derive and employ stand-off in accordance with the invention;

FIGS. 11, 12 and 13 are respectively a side elevation view, cross-sectional view and perspective partially broken away view of an alternate embodiment for an acoustic transducer linear array for use in apparatus in accordance with the invention;

FIGS. 14 and 15 are respectively a perspective view and side view in elevation of another acoustic array for use in an apparatus in accordance with the invention; and FIG. 16 is a perspective view of another acoustic array for use in an apparatus of this invention.

DETAILED DESCRIPTION OF THE DRAWINGS

Figure 6:
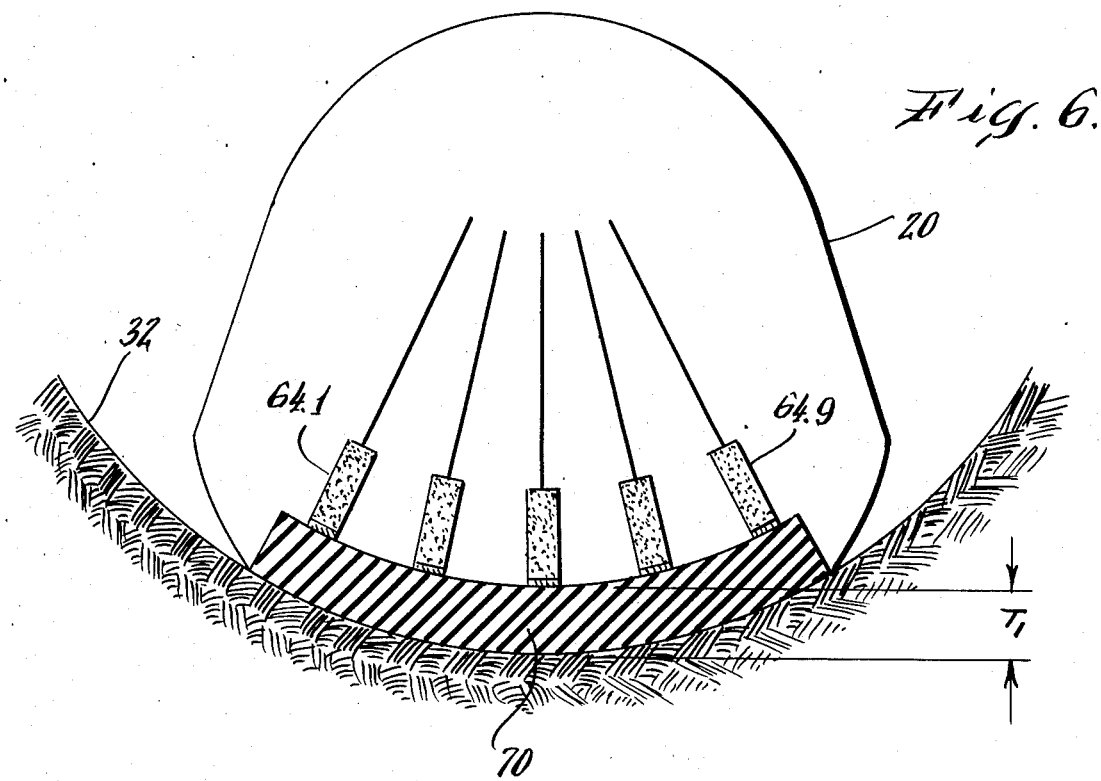
FIG. 6 is a horizontal section view taken along a plane intersecting a linear acoustic transducer array employed on the tool shown in FIG. 1.

With reference to FIGS. 1-4, a tool 20 for investigating an earth formation from a borehole 22 is shown connected by a cable 24 to surface located equipment 26. The tool 20 includes a transducer tool segment 21 which employs one or several sources of energy to investigate the borehole 22, a casing in the borehole, the wall of the borehole or deeper located earth formations. The transducer segment 21 measures a parameter which is sensitive to variations in the distance of segment 21 from the borehole. Hence, information of what this distance is while the investigation of the borehole is made is desirable to resolve ambiguities in the measured parameter. The tool segment 21 is shown in the form of a skid, though it should be understood that other borehole wall engaging arrangements such as a shoe or articulated pad can be used.

In the tool embodiment 20 of FIG. 1 the transducer segment 21 is formed with an array 28 of electrodes 30 of a type selected to make a detailed resistivity investigation of a substantially contiguous area of the borehole wall 32. A tool for making such resistivity investigation may be as described in a copending patent application entitled "Method and Apparatus for Electrically Investigating a Borehole", U.S. Ser. No. 288,554, now U.S. Pat. No. 4,468,623 filed July 20, 1981 by inventors David E. Palaith, Stanley C. Gianzero and D. S. K. Chan and assigned to the same assignee as of this invention. The surface of segment 21 has a curvature which is matched to the nominal curvature of the borehole wall 32.

The size of the electrodes 30 is made as small as is practical, for example as described in the above Palaith et al application, of the order of about five millimeters in diameter, so that the array may provide high resolution information, of the order of several millimeters, about the resistivity or conductivity of the borehole wall 32. The measure current $I_m$ emitted by electrodes 30 are, therefore, sampled at a high rate and the samples are transmitted by cable 24 to surface signal processing equipment 26. The latter generates a suitable record such as display log 34 on which the electrode's measure currents are plotted as resistivity graphs 36 and as a function of depth.

The resistivity investigation with the array 28 involves the use of small electrodes 30 to enable detection of relatively small resistivity anomalies such as presented by a fracture 38 or a boundary 40 between thin beds 42, 44. Although the tool 20 is provided with suitable bow springs 50 to urge the array 28 of electrodes 30 towards wall 32 of borehole 22, conditions may arise whereby a space, known as stand-off, is created between electrodes 30 and wall 32 of the borehole 22. The stand-off causes the resolution of the current measurements to degenerate and logs derived from these measurements become difficult to interpret. Such stand-off may arise, for example, as a result of the presence of a cavity in front of the tool segment 21 or a mudcake or by a lift off or a tilt condition of the tool 20. As a result of the stand-off, the electrode current measurements lose resolution leading to ambiguous interpretations. When the stand-off is detected with the same order of resolution as is present with the use of array 28 and is determined with sufficient accuracy commensurate with the sensitivity of the electrical measurement to the magnitude of the stand-off, smoothing effects present in the log 34 of the electrical measurements can be more precisely interpreted.

The effect of a stand-off condition can be appreciated, for example, with reference to FIG. 2. In this figure a small button electrode 30 is shown at 52 in close proximity to the borehole wall 32 and capable of injecting a focused electrical current 53 into the formation in the manner as described in the aforementioned patent application to Palaith et al. When such close proximity condition exists as the tool is pulled up along the borehole wall, the output current from the electrode 30, when it crosses the boundary 40 between adjacent beds 42, 44 of different resistivities, is as illustrated with curve 54. In the event the electrode 30 crosses a fracture such as 38, the presence of its higher conductivity causes a response characteristic as illustrated with curve 56.

When, however, a stand-off condition arises such as shown at 57 in FIG. 2 where a mudcake 60 has developed between the electrode 30 and the borehole wall 32, the current distribution is less focused and the responses of the electrodes to surface anomalies such as fractures or thin bed boundaries are likely to be as shown with curves 58 and 60. These curves 58, 60 exhibit a smoothing of the electrode measure currents as if slower formation changes occur than is actually the case. Since the high resolution of the array, of the order of 2.5 mm, is intended to provide a detailed "picture" of the wall 32, the presence of mudcake 60 or a tilt condition seriously affects the array measurements.

Accordingly, a stand-off investigating acoustic transducer is employed in close proximity to the microresistivity measuring array 28 so as to obtain a measurement of the stand-off with sufficient spatial resolution that the stand-off opposite each of the individual electrodes 30 in the array 28 can be derived. In the embodiment as illustrated in FIG. 1, a number of stand-off investigating transducers 64, are provided, each oriented to direct acoustic pulses towards the borehole wall and sense acoustic reflections caused at interfaces of media having contrasting acoustic impedances such as the wall 32 behind the mudcake 60. With acoustic transducers 64 accurate measurements of stand-off can be made with a spatial resolution generally of the same order as the spatial resolution capability of the electrodes 30 in the array 28 and with an accuracy commensurate with the sensitivity of the electrode current measurements to stand-off conditions. The stand-off measurement SO as derived with signal processor 26 is recorded as log SO as a function of depth on log 34.

As illustrated in the view of FIG. 5, stand-off detecting transducers 64 are distributed at precisely known distances from and in close proximity to array 28. Hence, the measurements of the magnitude of the stand-off with these transducers can be accurately depth shifted and interpolated to derive the amount of stand-off opposite each of the electrodes 30 in array 28.

For example, if the tool 20 exhibits a significant tilt as illustrated in exaggerated fashion in FIG. 5A, the resulting different stand-off as measured with transducers 64.1–10 and 64.11, 64.12 can be determined. An appropriate geometrical process can be implemented to derive the degree of stand-off (SO) opposite the respective electrodes 30 in array 28.

Although a single acoustic transducer 64 could be employed to determine stand-off, when an electrical array 28 is used there are a number of factors making it preferable that more than a single acoustic transducer 64 be employed. For example, the borehole surface opposite the electrode array 28 is likely to have small irregularities leading to different resistivity responses by different electrodes 30 in the array 28. Or, the borehole cross-sectional shape is such as to cause unpredictable tool orientations relative to the borehole wall 32. Since the effect of these factors on the resistivity measurements are unlikely to be resolved with the stand-off measurement by a single acoustic transducer 64, preferably several acoustic transducers 64 are used so as to be able to measure the stand-off opposite each of the electrodes 30 in the array.

In the tool embodiments shown in FIGS. 1 and 5, the acoustic transducers 64 are laterally spread in a linear array 66 vertically below the electrode array 28 and with a pair of spaced transducers 64.11 and 64.12 above array 28. The use of linear array 66 enables the acoustic detection of a small cave which, when bridged by the array so as to be opposite several but not all of the electrodes 30, would cause ambiguities in the electrode measure currents. These ambiguities are resolved by the measurements made with the linear acoustic transducer array 66.

The spatial resolution of the acoustic array is, therefore, selected so as to be able to distinguish the presence of a small cave opposite the electrical array from the smoothed electrical responses obtained from the electrodes 30 opposite such cave. Thus, the spatial resoltuion of the acoustic array 66 preferably is in the range from that of the electrical array 30 to about five times that. This enables the recognition of a cave bridged by array 28 and larger than the crossectional area of an electrode 30. Since the stand-off does not normally vary significantly over short distances, the acoustic array 66 may be formed with spaced-apart acoustic transducers 64 as shown in FIGS. 1 and 5. The number of acoustic transducers 64 in the array 66 being then selected to obtain a spatial resolution of the order that is generally commensurate with the spatial resolution of electrical array 28.

The acoustic transducers 64 may be made in the manner as more particularly described in the aforementioned U.S. patent to Havira. The transducers 64 as shown in FIG. 2 are each formed with a piezoelectric element 65 which is located between an acoustic backing material 63 and an acoustic delay line 70 whose end interface surface 72 terminates substantially at the same surface as for electrodes 30 on tool 20.

Different types of transducers 64 may be used. The transducers shown in FIGS. 1–7 are of a cylindrical design with a diameter D of about 6 mm. The excitation pulses for transducers cause transmission of acoustic waves at a frequency of the order of about one MHz. At this operating frequency the transducers operate with a near field region out to a distance of $D^2/\lambda$ so that the field pattern remains essentially collimated over the stand-off distances of interest, i.e. generally less than about 20 mm though a larger stand-off can be accommodated. The spatial resolution of such transducer is on the order of 5 to 10 mm.

The selection of these transducer dimensions and operating frequency may vary. For example, the diameter D, see FIG. 5, may be increased to obtain a longer collimated near field region with less sensitivity to rough wall surfaces. A larger diameter, however, normally yields less spatial resolution over the stand-off distances of interest.

The transducer frequency may be increased to obtain a better range resolution and a longer near field region. However, such higher frequency increases sensitivity to surface roughness and is subject to higher attenuation.

The acoustic delay line 70 may be increased in length, l, to increase the maximum observable stand-off and decrease source ring-down effects if there are any. However, too long an acoustic delay line 70 decreases the firing rate and increases the decay time of reverberations so as to likely result in poorer spatial resolution. A delay line 70 for use at an operating frequency of one MHz and with a transducer diameter of about 6 mm may have a length of about 10 mm. The length of the delay line 70 is selected sufficient so as to allow sufficient "ring-down" time and thus prevent the incidence of an acoustic return on transducer 64 before its energizing pulse has terminated. The length is represented by the time T1 that it takes for an acoustic pulse to travel to end interface surface 72. Since the interval T2 used by an acoustic pulse to travel from the surface 72 to borehole wall 32 is to be measured as an indication of the stand-off, SO, the transducer 64 is also employed to sense acoustic returns. The stand-off interval T2 is derived from the detection of the acoustic reflection of the acoustic pulse from borehole wall 32. A stand-off indication may be obtained by measuring the round-trip travel time for an acoustic pulse to travel to wall 32 and subtracting from that the round-trip travel time to end interface surface 72.

The high resolution of the electrode array 28 requires that the stand-off, SO, be measured with a corresponding spatial resolution and with an accuracy commensurate with the sensitivity of the array resistivity measurements to stand-off. This imposes a high degree of accuracy on the stand-off measurement. Generally, when a stand-off sensitive electrical measurement is made with an array 28 as described in the aforementioned Palaith et al application, stand-off should be measured so as to be able to distinguish thicknesses differing from each other by about five millimeters. There are a number of factors, however, which tend to degrade the accuracy of an acoustic measurement of the stand-off. For example, changes in temperature and pressure encountered by the tool 20 in the borehole affect the propagation time through delay line 70 and thus the accuracy of transducers 64 and the mudcake acoustic velocity may vary as a function of borehole depth.

Tool 20 employs calibration acoustic transducers 74, 76 with which respectively the effect of the borehole environment on the stand-off investigating transducers 64 and the acoustic velocity of the borehole fluid can be measured as a function of borehole depth. Transducer 74 enables measurement of the travel time $T_1$ of acoustic pulses through delay lines 70. Acoustic transducer 76 measures the velocity of the borehole fluid, $V_m$, through a slot 78 of known width and exposed to borehole fluid. The borehole fluid acoustic wave velocity $V_m$ approximates that of the mudcake.

Measurement of the borehole fluid acoustic wave velocity may be done as shown with a slot 78 cut in a lower portion of the tool 20 projecting segment 21 on which the array 28 of electrodes 30 is located. Alternatively a slot or gap 78 may be at another suitable place on tool 20 but preferably at such location where the borehole fluid in the gap 78 is able to pass through so that the velocity measurements are made for borehole fluid at a borehole depth in the vicinity of where the array 28 is employed. Gap 78 is, therefore, preferably at the side or back of the tool segment 21.

Actuation of the electrode array 28 and sampling of measure currents $I_m$ is done with a network 84 as more particularly described in the aforementioned patent application to Palaith et al. The sampled measure currents $I_m$ on output line 86 are transmitted along cable 24 to signal processor 26.

Energization, detection of acoustic reflections and measurement of time intervals with acoustic transducers 64, 74 and 76 is done with the aid of a network 88 similar to that as described in the Havira U.S. Pat. No. 4,225,798. The network 88 includes a signal processor 90 which actuates the transducers in sequence through pulsers 92 and enables time interval detections of reflections through a gated amplifier 94. In addition entire reflections are gated in through a return detector amplifier 96 having a threshold level set by a network 98 controlled by signal processor 90.

With network 88 the acoustic reflections such as 100 in FIG. 3 from the end surface/mud interface 72 and the reflections such as 102 from the borehole wall 32 are detected and analyzed to generate appropriate signals for a precise determination of stand-off. These signals include the time intervals $\Delta T_F$ on line 104 for the arrival of the wall reflection 102 since the start of the acoustic pulse 106 which caused the reflection and the magnitude $E_F$ on line 108 of wall reflection 102, such as its peak level or energy content.

In addition, a calibration section 110 in signal processor 90 provides a time interval signal $\Delta T_{CAL}$ on line 112 representative of the time $T_1$ for a pulse 106 to travel through delay line 70. A signal $E_m$ on line 114 and representative of the magnitude of the transducer/mud interface reflection 100 is produced. A signal representative of the borehole fluid acoustic wave velocity $V_m$ is produced on line 116 in the form of a measured time interval $\Delta T_{mud}$ for an acoustic pulse such as 106 to traverse a known distance through the mud, such as through the width of slot 78.

FIGS. 5 and 6 illustrate the placement of acoustic transducers 64 with respect to electrode array 28 with greater detail. The array's electrodes 30 are small, of the order of 2.5 mm in radius, r, and are shown closely spaced to each other in overlapping relationship in multiple rows spaced at regular distances L. The measure currents $I_m$ from these electrodes 30 are sampled at sufficient frequency so that a resistivity pattern of the borehole wall can be obtained with a resolution measured on the order of millimeters. With such high resolution fine borehole wall details can be measured.

With such high resolution, however, the effect of stand-off tends to be significant and the stand-off if any should be measured to resolve ambiguities in the electrode measure currents $I_m$. Measurement of stand-off, however, should be done at close vertical distances from array 28 in order to minimize errors introduced when the stand-off measurements are depth shifted to determine the stand-off conditions in front of the electrodes 30. The stand-off investigating acoustic transducers 64 are, therefore, spaced at predetermined locations and close depth-shiftable distances, d, of the order of millimeters from the array 28.

The spacing, d, between the electrical array 6 and stand-off measuring transducers 64 may be varied, preferably as small as possible. When transducers 64 are close to electrical array 28, the depth shifting of stand-off measurements results in a more precise determination of the stand-off opposite the electrodes 30. However, too close a spacing d may interfere with the mechanical wiring and space needs of the electrical array. When the spacing d is large, the stand-off measurements are more difficult to accurately align by depth shifting with the electrical measurements made with electrical array 28.

Since the acoustic transducers 64 are in turn sensitive to borehole environmental conditions, calibrating transducer 74 is employed to direct acoustic pulses at a fixed reflective target 130 which is of highly contrasting acoustic impedance and is located at the end surface of the same type of delay line 70 as employed with transducers 64. This permits a precise measurement of the acoustic travel time through delay line 70 while this is affected by local borehole conditions.

The mud calibrating transducer 76 is located in direct, through its end surface interface 72, acoustic pulses at a remote target 132 in the form of slot wall 134 which is at a precisely known distance S from the end surface 72.

With reference to FIGS. 7-9 apparatus and use of the calibration transducers are shown. When signal processor 90, see FIG. 1, commences with actuation of transducer 74 at a time $t_o$ a significant return reflection 100 is generated by the fixed target 130 so that at the end of an interval corresponding to the travel time through delay 70 a return is detected at time $t_a$. At another time transducer 76 is actuated to generate a pulse 106 which travels through delay 70. Such delay 70 is formed of a material whose acoustic impedance approximates that of the borehole fluid as closely as possible so that the reflection arising at interface 72 should be very small. Notwithstanding such material selection, however, impedance mismatches are likely to occur at the end interface surface 72 leading to a significant reflection 100. A short interval later the acoustic pulse transmitted through the space S is incident upon target 132 causing detection of a reflection 140 at a time $t_b$.

FIG. 9 illustrates a signal processor routine 148 for operating the acoustic transducers 64, 74 and 76 and employing the measurements made therewith. The routine 148 includes portions which may be carried out in whole or in part downhole by signal processor 90. Commencing at 150 calibrating transducer 74 (referred to in FIG. 9 as TU$_{CAL}$) is actuated and the time $t_o$ this is done, stored at 152. At 153 a value for a threshold is set. This threshold level is selected sufficiently high to avoid responding to system noise, yet not too high lest the equipment is unable to detect the echo from end surface 130 or the acoustic reflection from the transducer/mud interface 131 of transducer 76 at slot 78. The selection of a threshold as referred to herein may also be obtained by the control of the gain of a variable gain amplifier (VGA) whose input is coupled to a transducer 64 through a multiplexer as shown in the U.S. Pat. No. 4,255,798 to Havira. In such case, a comparator compares the output of the VGA to a fixed reference level and detects an acoustic reflection when the amplifier output exceeds this reference level.

A waiting sequence is then begun to determine at 154 whether reflection 100 has arrived and when this is detected the time of arrival, $t_a$, stored at 156. The difference in time between $t_a$ and $t_o$ is determined at 158 and is the time interval $\Delta T_{CAL}$ associated with the travel of acoustic pulses through delay lines 70 of transducers 64, 74 and 76.

Transducer 76 (Tu$_{mud}$), used for measuring the acoustic velocity of the borehole fluid, is energized at 160 and the time this is done is stored at 162. A time window is then selected at 164 with a time duration commensurate with the maximum interval at which an acoustic reflection from the delay line/mud interface 72 should occur. A check is then made at 166 whether a reflection 100 has been detected and if not, a test is made at 168 whether the time window has passed. The latter test allows for the event when acoustic impedances of the delay 70 and the borehole fluid are so closely matched that the acoustic reflection 100 is too small to detect. Hence, if the time window has timed out a lower threshold, TH, is set at 170 and a return is made to step 160. The lowering of the threshold is done preferably with a small decrement. The process of energizing transducer 76 and decrementing the threshold is continued until an interface reflection is detected at 166. The time $t_a$ at which the latter reflection is detected is stored at 172. The amplitude A of the reflection at the delay line/mud interface 131 is measured at 174. Care should be taken not to reduce the threshold at 170 below a level at which noise instead of an echo is detected. Accordingly, a test is made at 175 whether the threshold, TH, has been decremented to its lowest acceptable level. Such level is a function of system noise and is pre-set at some level above that. When the test indicates a lowest threshold level the next step is carried out at 176 where the value for time $t_a$ is set equal to $\Delta T_{CAL}$ and the echo amplitude at a reference value A$_R$.

A check is then made at 178 whether a wall reflection 140, i.e., the acoustic reflection of the slot wall 132 has been detected in excess of the last decremented threshold value TH. If not, a waiting cycle is entered, which may be escaped, if at 179 the waiting time exceeds a maximum T$_{MAX}$. The time $t_b$ of arrival of reflection 140 is stored at 180. The mud calibration interval $\Delta T_{mud}$ may then be determined at 182 as the difference between the time $t_b$ and $t_o$ and by subtracting from this difference the travel time $\Delta T_{CAL}$ representative of the acoustic pulse round-trip travel time through delay line 70. The acoustic wave velocity of the borehole fluid may then be calculated at 184 according to the relationship $$V_m = 2\ S/\Delta T_{mud}.$$

Once transducers 74, 76 have been used to generate signals representative of the calibration $\Delta T_{CAL}$ of the delay lines 70 and the acoustic wave velocity of the borehole fluid V$_M$, the stand-off investigating acoustic transducers 64 are energized commencing with the first transducer, Tu$_1$, at 190 and the time this is done is stored at 192. A threshold is set at 191 with a value A+$\Delta$ which is slightly higher than the measured amplitude A for the reflection 100 (see FIG. 8) at interface 72 (see FIG. 7) and as measured at 174. With this threshold detection of a reflection from the borehole wall 32 with a small amount of stand-off can be made. The detected returns from firing of the first transducer $Tu_1$ are analyzed at 194 for arrival of the wall-reflection 102 (see FIG. 3) by sensing whether the reflection 102 exceeds the threshold value TH as set at 191. If the wall reflection has arrived, its time of arrival, $t_f$, is stored at 196 and its energy content $E_f$ measured.

In the event no wall reflection is sensed at 194 from the firing of transducer $Tu_1$, a waiting cycle is entered. If the time lapsed since the actuation of the transducer $Tu_1$ at 190 exceeds the delay interval $\Delta T_{CAL}$, as checked at 202, a new lower threshold level TH, less than $A + \Delta$ as generated at 191, is set to be effective thereafter at 204. The lower threshold enables the subsequent detection of a small borehole wall return whose peak magnitude is less than the reflection arising at the transducer/mud interface 72. Change to a lower threshold level, TH, enhances the sensitivity in the detection of smaller returns from a more distantly located mudcake interface. The lower threshold level, however, is not set so low as to detect noise spikes. A check is then made at 205 whether an acoustic reflection has been detected which exceeded the lower threshold as set at 204. If so, a return is made to 196 to store the time of arrival $t_a$ and measure the magnitude $E_f$ of the wall reflection.

When no return is detected at 205, a test is made at 206 whether the elapsed time exceeds a maximum $T_{MAX}$. If not, a return is made to step 205 to again look for a wall reflection. In the event no wall reflection is detected and the maximum time has elapsed, a maximum value for the arrival time $t_f$ is set at 208 and a return is then made to step 212.

At step 212 a check is made whether the above process needs to be executed for another transducer Tu. If so, a counter representative of the number of transducers 64 is incremented at 214 and the next transducer $Tu_1$ is then energized at 190.

After all transducers 64 (TU) have been operated and wall reflections 102 have been detected the interval due to stand-off, if any is present, is determined at 218 for each transducer by determining the interval $\Delta T_f$ for the wall reflection 102 and subtracting therefrom the interval for the delay line $\Delta T_{CAL}$. This is done for each stand-off investigating transducer 64 and in sequence and if desired the interval measured with the transducers 64 can be recorded at 220 as representative of the amount of stand-off.

A more precise determination of stand-off, SO, is obtained, however, by multiplying the measured interval representative of stand-off by the measured acoustic wave velocity $V_M$ at 222 and recording this at 224.

The electrode measure currents $I_m$ are sampled at 226 either simultaneously with the operation of the acoustic transducers or in sequence. The sampled current values are recorded at 228 and a return made at 230 to the beginning of routine 148 at step 150.

The routine 148 is cycled through at a rapid speed. In this manner vertical motion of tool 20 can be made to have but a small effect on the vertical resolution of the stand-off investigating acoustic transducers 64. The cycling speed may vary depending upon the speed of movement of tool 20, but may be of the order of several kiloherz.

With the measurement of stand-off, an improvement of the attendant loss of resolution by the electrode array 28 can be achieved using a deconvolution technique. This may be implemented as shown in FIG. 4 by applying the stand-off, depth and and electrode current measurements to a stand-off corrector 240. The latter represents a routine for a signal processor with which a deconvolution of the electrode current data can be executed. Such deconvolution may be applied to electrode currents $I_m$ for which stand-off is approximately constant. Such deconvolution scheme may follow well known steps as described in an article entitled "On The Application of Eigenvector Expansions to Numerical Deconvolution" and published by M. P. Ekstrom and R. L. Rhoads at page 319 in the Journal of Computational Physics, Vol. 14 No. 4, April 1974 and an article entitled "Removal Of Intervening System Distortion By Deconvolution" by the same authors but published in the IEEE Transactions On Instrumentation And Measurement, Vol. IM-17, No. 4, page 333 of the December 1968 issue.

Figure 10:
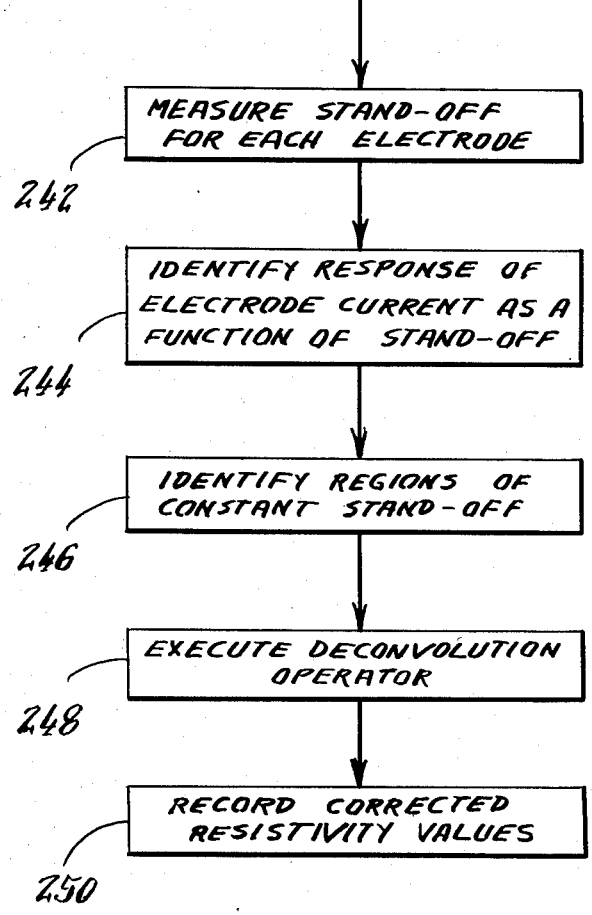
FIG. 10 is a flow chart for a routine used in a signal processor to correct parameter measurements with stand-off measurements in accordance with the invention.

The deconvolution technique of resolution corrector 240 may be carried out by the steps of the corrector routine in FIG. 10. Thus, commencing at 242 the stand-off for each button electrode 30 in the array 28 is measured using the apparatus and steps as previously described with the stand-off investigating acoustic transducers 64 and with the information derived with calibrating transducers 74, 76.

At 244 a system function $H_d(x, z)$ associated with the measured stand-off is derived. This may be done by storing a numerical set of response characteristics for different stand-off values, such as, for example, from zero stand-off to 15 mm of stand-off at intervals of say 5 mm, though different interval values may be employed.

At 246 the two dimensional borehole wall region (x, z) is separated into regions of approximately constant stand-off. At 248 these identified regions of generally constant stand-off are subjected to a deconvolution process in a manner described in the foregoing articles to remove or at least moderate the resolution loss due to stand-off and produce stand-off corrected resistivity values for recording at 250.

Variations of the described embodiments may be implemented. For example, the array of acoustic transducers 64.1-10 may be mounted in a different linear array configuration wherein each transducer directs its acoustic beam at a common reflector for its direction at the borehole wall. This is illustrated in the embodiments of FIGS. 11-16.

With reference to FIGS. 11-13, a linear array 260 of acoustic transducers 64 is shown mounted in a recess 262 below electrode array 28. The transducers 74 are located at an interface 264 which is opposite an acoustic reflecting surface 266. The recess 262 is filled with a material 268 which serves the function of acoustic delay line 70 and is, therefore, as closely matched as possible in its acoustic impedance to that of the borehole fluid. The linear array 260 is aligned along a cylindrical surface whose curvature is preferably selected commensurate with that of the borehole wall 32 in which the tool is expected to be used. The reflector surface 266 normally bears an angle of about 45° relative to the direction of the acoustic beams from the transducers 64 and the surface 269 of tool segment 21. The size of recess 262 and thus the length, 1, of the path traveled by the acoustic pulses and acoustic returns is selected commensurate with the delay desired as previously explained with reference to delay line 70.

FIGS. 14 and 15 illustrate yet another linear array 280 of acoustic transducers 64. The array 280 is formed of a pair of arrays as shown in FIG. 11 with reflecting surfaces 282, 284 in adjacent recesses 286, 288. The recesses 286, 288 are filled with acoustic impedance matching and delay material 268. The array 280 enables a close spacing of the acoustic transducers 64 and, as shown in FIG. 15, a contiguous acoustic investigation of the stand-off in the borehole wall area opposite the electrical array 28.

In FIG. 16 an acoustic transducer array 290 is shown suitable for use with an electrode array 28. The array 290 is formed with a layer 292 of acoustic pulse generating material overlying and attached to an acoustic absorbent layer 294. Layer 292 is scribed to divide it into separately excitable transducers 64, each of which generates a beam of acoustic energy through delay line layer 70'.

Determination of the presence of a tilt condition as illustrated in FIG. 5A can be made as well as for a lift-off condition where a lateral side of the tool segment 21 is lifted away from the borehole wall 32. The tilt condition can be derived from a consistent difference over some depth in the stand-off measured by vertically spaced and generally aligned stand-off investigating transducers 64.1 and 64.11 for example. Similarly a lift-off condition can be detected from a consistent difference in the stand-off measured by laterally spaced transducers such as 64.1 and 64.10.

Having thus described an appartus and method for determining the stand-off of a borehole tool segment from which a stand-off sensitive parameter is measured, the advantages of the invention can be appreciated.

Description of the embodiments herein are, therefore, to be illustrative of the invention, the scope of which is to be determined by the following claims.

We claim:

1. A method for investigating an earth formation penetrated by a borehole with a tool having a segment which is provided with a laterally extending array of small current emitting electrodes arranged to make resistivity measurements in such spatial relationship that a contiguous lateral area of the borehole is investigated as the tool segment, while being pressed towards the borehole wall, is operatively moved along the borehole wall, said electrodes being sized to enable a high resolution resistivity investigation of the earth formation with a resolution of the order of millimeters, comprising the steps of:

generating high resolution beams of acoustic energy in the form of pulses and directing these at segments of the borehole wall from places that are from at least laterally separated places that are generally in vertical alignment with the array of electrodes and are pressed with the array towards the borehole wall;

detecting at said places acoustic reflections originating from the borehole wall segments and caused by said pulses of acoustic energy; and deriving from the detected acoustic reflections acoustic travel times indicative of the magnitude of tool standoff at said places as well as lateral tool lift-off at said array of electrodes with an accuracy and resolution sufficient to resolve, in said resistivity measurements, ambiguities attributable to stand-off, and vertical and lateral tool tilt.

2. The method as claimed in claim 1 wherein said generating step further includes:

generating said acoustic beams with a spatial resolution generally of the same order as the spatial resolution of said resistivity investigation.

3. The method as claimed in claim 1 wherein said directing step further includes:

directing said pulses from locations vertically spaced both above and below the array of electrodes and extending in an array laterally across the tool segment and, wherein the derived acoustic travel times are also indicative of vertical tool tilt.

4. The method as claimed in claim 1 and further including the steps of:

detecting acoustic reflections of test pulses arising at an interface of a fluid calibrating transducer with borehole fluid;

determining the magnitude of said latter reflections; and wherein said step of detecting acoustic reflections detects acoustic reflections which exceed said determined magnitude.

5. The method as claimed in claim 1 and further including the steps of:

directing first acoustic test pulses from a first calibrating transducer at a first target on the tool having a fixed known position relative to the first calibrating transducer;

detecting reflections of said test pulses from the target;

determining, from said detected reflections, signals representative of the calibration as a function of depth of earth formation investigating transducer used to generate said high resolution beams;

directing second acoustic test pulses from a fluid measuring transducer through borehole fluid at a second target on the tool having a known distance from said fluid measuring transducer;

detecting reflections from said second target;

determining, from said latter reflections, signals representative of the acoustic velocity of the fluid in the borehole; and deriving from the detected acoustic reflections from the borehole segments and from said first and second targets an indication of the magnitude of stand-off of said array that is corrected for local borehole conditions to produce said stand-off indications with an accuracy that is sufficient to resolve ambiguities in said resistivity investigation attributable to stand-off.

6. The method as claimed in claim 5 and further including the steps of:

measuring first time intervals between the generation of pulses and the detection of reflections caused thereby from the wall of the borehole;

measuring second time intervals between the generation of said first acoustic test pulses and the reflections caused thereby from the first target;

subtracting said second time intervals from the first time intervals to derive third time intervals representative of the stand-off; and modifying said third time intervals with said signals representative of the acoustic velocity of the borehole fluid to derive an indication of a stand-off adjusted for bore hole conditions as measured at the depth where said stand-off is derived.

7. A method for investigating an earth formation penetrated by a borehole with a tool employing a plurality of similar earth formation investigating acoustic transducers for measuring acoustic parameters of the earth formation, comprising the steps of:

during an investigation by the tool within the borehole directing acoustic test pulses from an acoustic transducer at an acoustic reflection target which is located so as to enable measurement of an acoustic characteristic of the latter transducer as a function of borehole depth;

detecting acoustic reflections from the target with the latter acoustic transducer and caused by said acoustic test pulses;

deriving from said detected reflections measurements of an acoustic characteristic of the latter transducer as a function of borehole depth; and applying the derived measurements so as to enable a correction of measurements made with said earth formation investigating transducers for variations in the performance of said latter transducers as a function of borehole depth.

8. The method as claimed in claim 7 wherein said deriving step further includes the steps of:

measuring first time intervals between the generation of acoustic pulses from an earth formation investigating transducer placed on the tool and the detection of reflections caused thereby from the wall of the borehole;

measuring second time intervals between the generation of said acoustic test pulses and the detection of reflections thereof from the target; and subtracting from said first time intervals said second time intervals to determine a third time interval indicative of stand-off of the tool from the borehole wall.

9. The method as claimed in claim 8 wherein said deriving step still further includes the steps of:

measuring a borehole fluid parameter representative of the acoustic velocity of the borehole fluid as a function of depth and applying said measured borehole fluid parameter to said measured third time interval to adjust said stand-off measurement for local values of the acoustic velocity of the borehole fluid.

10. An apparatus for investigating an earth formation penetrated by a borehole with a tool having a segment which is provided with a laterally extending array of small current emitting electrodes arranged in such spatial relationship that a contiguous lateral area of the borehole is investigated as the tool segment, while being pressed towards the borehole wall, is operatively moved along the borehole wall, said electrodes being sized to enable a high resolution resistivity investigation of the earth formation with a resolution of the order of millimeters, comprising:

stand-off investigating acoustic transducer means for generating and directing high resolution beams of acoustic energy in the form of pulses towards segments of the borehole wall from places that are above and below the array of electrodes and at laterally separated places that are generally in vertical alignment with the array of electrodes and detecting at said places acoustic reflections originating from the borehole wall segments from acoustic pulses respectively generated at said places;

means for measuring, at said places, acoustic travel times of the acoustic pulses to the borehole wall and producing signals indicative of the magnitude of tool stand-off at said places as well as vertical and lateral tool tilt at said array of electrodes, with said measured acoustic travel times being measured with an accuracy and resolution sufficient to resolve, in said resistivity measurements, ambiguities attributable to stand-off, and vertical and lateral tool tilt.

11. The apparatus as claimed in claim 10 said transducer means includes an array of acoustic transducers laterally spaced on said tool segment in vertical depth-shiftable proximity to said array of electrodes.

12. The apparatus as claimed in claim 10 wherein selected ones of said stand-off investigating acoustic transducer are arranged in a laterally extended array having a known proximate, vertically spaced depth-shiftable position with respect to the array.

13. The tool as claimed in claim 10 and further including:

means for correcting said resistivity investigation as a function of the magnitude of the stand-off at said electrodes in the array.

14. The apparatus as claimed in claim 10 and further including a calibrating acoustic transducer; and means responsive to detected acoustic reflections caused by acoustic pulses from the calibrating acoustic transducer for generating calibration signals representative of the calibration of the stand-off investigating transducer means as a function of depth.

15. The apparatus as claimed in claim 14 wherein said measuring means includes;

means for detecting said reflection signals when they exceed a predetermined threshold level; and means responsive to the calibration signals for reducing said threshold level when an acoustic reflection has not been detected within a time period determined from said calibration signals.

16. The apparatus as claimed in claim 14 wherein said measuring means includes;

means for applying said calibration signals to reflection signals from said stand-off investigating acoustic transducer means to compensate said signals indicative of stand-off for the effect of borehole conditions on said transducer means.

17. The apparatus as claimed in claim 16 wherein said calibrating acoustic transducer is of like construction as said stand-off investigating acoustic transducer means and is provided with a target to provide an acoustic calibration reflection for detection by the calibrating acoustic transducer.

18. The apparatus as claimed in claim 16 wherein said means for producing signals indicative of stand-off further includes:

means for producing interval signals representative of the time intervals measured from the time the acoustic pulses giving rise to the acoustic reflections were generated until the acoustic reflections are detected;

and wherein said applying means includes means for extracting interval signals related to the calibration signals from the interval signals related to the reflection signals from the stand-off investigating transducer means.

19. The apparatus as claimed in claim and further including a borehole fluid measuring acoustic transducer; and wherein said means for producing signals indicative of stand-off includes means responsive to detected acoustic reflections caused by acoustic pulses from the borehole fluid measuring acoustic transducer for producing borehole fluid calibration signals representative of the acoustic wave velocity of the borehole fluid as a function of depth, and means for applying said borehole fluid signals to said signals indicative of stand-off to obtain a borehole fluid corrected indication of the magnitude of the stand-off at said array.

20. The apparatus as claimed in claim 19 wherein said means for generating borehole fluid signals includes means for establishing a borehole fluid filled path of known width and located in the path of acoustic pulses from the borehole fluid measuring transducer, said latter means including a target to cause acoustic reflections to return to said borehole fluid measuring transducer.

21. An apparatus for investigating an earth formation penetrated by a borehole with a tool employing a plurality of similar acoustic earth formation investigation transducers for measuring acoustic characteristics of the earth formation, comprising:
 a calibrating transducer similar to said earth formation investigating transducers and mounted on said tool to generate acoustic test pulses, an acoustic reflection target being so mounted as to enable the calibrating transducer to detect reflections from the target and enable it to measure an acoustic characteristic of the calibrating transducer as a function of borehole depth;
 means responsive to detected acoustic reflections from the target for generating calibration signals representative of the acoustic characteristic of the calibration transducer as a function of borehole depth; and
 means for applying the calibration signals so as to enable correction of measurements made with the earth formation investigating transducers for variations in the performance of said latter transducers as a function of borehole depth.

22. The apparatus as claimed in claim 21 and further including:
 a delay line mounted in opertive relationship with said calibrating transducer and terminating at an end surface opposite to said latter transducer, said target being mounted to said end surface to reflect said acoustic test pulses.

23. The tool apparatus as claim in claim 21 and further including:
 acoustic transducer means for calibrating the borehole fluid and producing a borehole fluid signal indicative thereof;
 means responsive to the borehole fluid signals and the calibration signals for correcting acoustic characteristics measured with the earth formation transducers for variations in the acoustic velocity of the borehole fluid and pressure and temperature in a borehole.

24. A method for investigating an earth formation penetrated by a borehole with a tool employing on a segment thereof a micro array of electrodes for measuring earth formation resistivity at discrete portions in such spatial relationship as to enable a high resolution resistivity investigation over a circumferentially contiguous area of the borehole wall and with the resistivity being measured with a high resolution of the order of millimeters and wherein the resistivity measurements are sensitive to the occurrence of a stand-off condition of said micro electrodes from the borehole wall, comprising the steps of:
 directing pulses of acoustic energy from a plurality of tool locations determined by an array of stand-off investigating acoustic transducers towards the borehole wall at circumferentially discrete segments thereof wherein the tool locations have a close depth shiftable proximity to the electrodes in the micro array so as to be able to relate acoustic measurements for the latter circumferentially discrete segments of the borehole wall with resistivity measurements of the discrete portions of the borehole wall opposite individual ones of the electrodes in the array;
 detecting acoustic reflections from the wall of the borehole;
 calibrating the acoustic transducers for depths at which resistivity measurements are made; and
 deriving from the detected acoustic reflections and the calibration step an indication of the magnitude of stand-off of individual ones of said electrodes with an accuracy sufficient to reduce, in said resistivity measurements of earth formations opposite electrodes, an ambiguity attributable to a stand-off condition.

25. The method as claimed in claim 24 wherein the calibrating step includes the steps of:
 directing acoustic test pulses from a first calibrating transducer at a tool located target having a known position relative to the first calibrating transducer;
 detecting acoustic reflections from said target as caused by the acoustic test pulses; and
 determining, from said latter detected reflections, calibration signals representative of the calibration of the stand-off investigating transducers as a function of depth.

26. The method as claimed in claim 24 wherein said directing step further comprises directing said pulses of acoustic energy in the form of beams whose cross-sectional dimensions are commensurate with the spatial resolution obtained with said electrodes.

27. The method as claimed in claim 24 wherein said directing step further comprises directing said acoustic pulses from tool locations both above and below said electrodes as viewed along the direction of investigation of said tool.

28. The method as claimed in claim 24 wherein the calibrating step comprises the steps of:
 directing first acoustic test pulses from a first calibrating transducer at a first target on the tool having a fixed known position relative to the first calibrating transducer;
 detecting reflections of said test pulses from the target;
 determining, from said detected reflections, signals representative of the calibration of the formation investigating transducer as a function of depth;
 directing second acoustic test pulses from a fluid measuring transducer through borehole fluid at a second target on the tool having a known distance from said fluid measuring transducer;
 detecting reflections from said second target; and
 determining, from said latter reflections, signals representative of the acoustic velocity of the fluid in the borehole as a function of depth.

* * * * *